United States Patent [19]

Jacoby

[11] 4,283,669
[45] Aug. 11, 1981

[54] PROCESS AND APPARATUS FOR THE AUTOMATIC MEASURING OF A WORKPIECE

[75] Inventor: Hans-Dieter Jacoby, Werdorf, Fed. Rep. of Germany

[73] Assignee: Ernst Leitz Wetzlar GmbH, Wetzlar, Fed. Rep. of Germany

[21] Appl. No.: 152,371

[22] Filed: May 22, 1980

[30] Foreign Application Priority Data

May 25, 1979 [DE] Fed. Rep. of Germany ....... 2921166

[51] Int. Cl.³ ............................................. G05B 19/36
[52] U.S. Cl. ................................... 318/578; 364/474; 409/99
[58] Field of Search ..................... 318/578, 576, 571; 364/474; 409/130, 99

[56] References Cited

U.S. PATENT DOCUMENTS

| 3,292,495 | 12/1966 | Hill et al. | 409/99 |
| 4,057,703 | 11/1977 | Pfau | 364/474 X |
| 4,157,679 | 6/1979 | Wenzel | 318/578 X |
| 4,224,670 | 9/1980 | Yamazaki | 318/578 X |

Primary Examiner—B. Dobeck
Attorney, Agent, or Firm—Schwartz, Jeffery, Schwaab, Mack, Blumenthal & Koch

[57] ABSTRACT

A process of and an apparatus for the automatic measuring of a workpiece. The workpiece is carried on a coordinate table which is mounted for movement relative to a scanning head in two mutually orthogonal directions. A control device moves the workpiece relative to the scanning head at a constant rate in one direction and at a rate in the other direction so as to maintain a constant pressure of the scanner head on said workpiece. The rates of movement in both directions are periodically compared and when equality is reached reversal occurs wherein control of the constant rate is switched to the scanning head and control from the scanning head is switched to a constant rate. This reversal permits uninterrupted measuring in an automatic mode.

4 Claims, 2 Drawing Figures

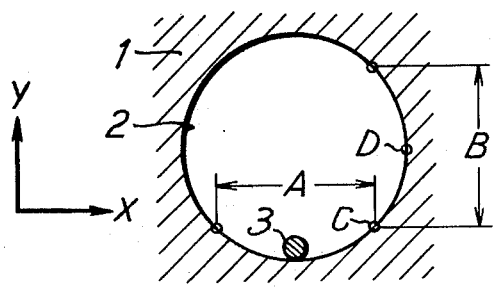
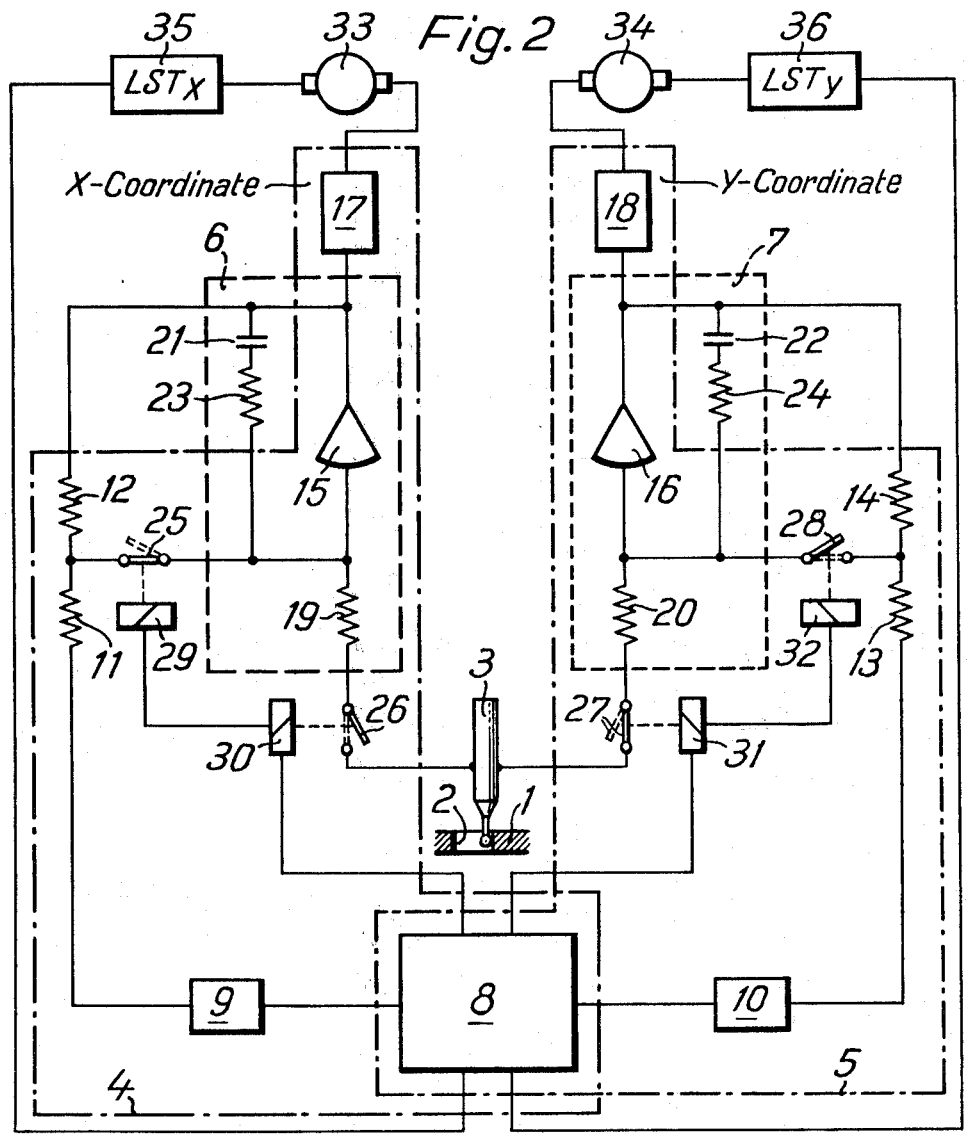

PROCESS AND APPARATUS FOR THE AUTOMATIC MEASURING OF A WORKPIECE

BACKGROUND OF THE INVENTION

The invention concerns a process and an apparatus for the automatic measuring of a workpiece carried on a coordinate table movable in at least two mutually orthogonal directions by scanning the workpiece by at least one stylus of a scanning head, during a relative movement between the workpiece and the scanning head in one coordinate direction.

Processes and devices of this type are important in the case of three coordinate measuring machines whereby the profile of a workpiece is to be scanned and wherein the scanner and the workpiece are to be maintained in permanent contact by means of suitable control measures.

A process and an apparatus for this purpose are known from DE-OS No. 26 54 839, whereby an absolute measured value is determined for the deflection of the scanning stylus produced during the scanning of the workpiece and wherein by the addition with the correct sign of the measured value of the stylus deflection and of a measured value indicating the position of the measuring head, a value characterizes each contour location of the workpiece. Wherein further measured values are determined such that the workpiece or the measuring head is always moved in a direction that is laterally offset with respect to the deflection of the stylus and by that during the peripheral scanning of the workpiece the scanning stylus is constantly deflected from its base position.

U.S. Pat. No. 3,394,248 to Ogden further discloses a system for the measurement of the magnitude of a relative motion between an object and a reference point, wherein optical gratings are used in order to convert the motion, by means of photoelectrical elements, into electrical pulses, which depending on their direction of motion are fed into a forward/backward counter by means of an addition or subtraction stage.

A type of measuring machine is also known, wherein control signals are derived from the signals of an induction scanner which represent the deflection of the scanning head in mutually orthogonal directions. The signals are utilized in a control circuit, which maintains a predetermined contact pressure during relative motion of the workpiece and the scanning head in one coordinate direction.

However, the above-mentioned measuring machines have the common disadvantage that in the vicinity of the point of switching from one measuring coordinate direction into the other measurements become inaccurate as the result of the drag error generated by the friction between the workpiece and the scanner.

Another disadvantage common to the known measuring machines is that the scanning process is interrupted during the switching, because first the relative motion between the scanning head and the workpiece in one coordinate direction must be stopped before the relative motion in the other direction may be initiated. The error caused by braking and acceleration prevents the acquisition of measuring values within a certain range.

SUMMARY OF THE INVENTION

It is therefore the object of the present invention to eliminate the disadvantages appearing during the scanning of profiles with the known measuring machines and to effect a switching process from one measuring coordinate to the other without stopping the relative motion between the workpiece and the scanning head and without interrupting the acquisition of data.

According to the invention, the above and other objects are attained by following the location of the workpiece with a scanner in contact by a predetermined force therewith along the second measuring coordinate direction and moving the coordinate table by means of a predetermined control voltage along the first measuring coordinate direction (primary coordinate). In order to maintain the contact pressure between the scanner and the workpiece, the coordinate table is actuated and moved in the second coordinate direction (secondary coordinate) at a velocity required for the follow-up adjustment of the scanner, by means of an electrical voltage generated in the control circuit and corresponding to the deflection of the scanner from its base position. The control voltage of the motion in the primary coordinate direction and the regulating voltage of the secondary coordinate direction are continuously compared with each other, and that when the two voltages are substantially equal, the predetermined primary and secondary velocity values are exchanged.

The above-mentioned process is further characterized in that the regulating circuit being actuated by the changeover of the predetermined primary and secondary velocity values is always being prepared for the correct setting of the initial velocity of the adjusting motion of the scanner controlled by said regulating circuit.

According to one embodiment of this invention, a control circuit and a regulating circuit is associated with each of the measuring coordinate directions in order to actuate motors that move the workpiece in a respective one of said coordinate directions by means of their output signals.

According to the present invention, a linear step transducer is provided for each measuring coordinate direction, said transducer being connected with the coordinate table and determining the magnitude of its movement.

It is further provided that a common computer is inserted preceding the control circuits to feed in the predetermined values for the scanning of the workpiece in the primary coordinate direction.

According to a further embodiment of the present invention, it is also possible to insert in place of the computer a circuit with comparators preceding the control circuits. In accordance with the invention, the regulating circuits are coordinated with the scanner and are actuated by it.

Switches and means to actuate them are arranged in the control and regulating circuits to effect the switching of the interchange of the predetermined values of primary and secondary velocities.

BRIEF DESCRIPTION OF THE DRAWINGS

A more complete appreciation of the invention and attendant advantages thereof will be more clearly understood by reference to the following drawings, wherein:

FIG. 1 is a partial plan view of the workpiece depicting the scanning process in detail; and FIG. 2 is a circuit diagram of one embodiment of the present invention.

DETAILED DESCRIPTION OF THE PREFERRED EMBODIMENTS

Referring now to the drawings wherein like reference characters designate like parts throughout the several views, FIG. 1 discloses the scanning of a hole in a workpiece 1 by a scanning stylus head 3.

In a workpiece 1, not shown completely, a hole 2 is to be measured by scanning with an inductive scanner. The scanning process itself takes place in the plane "xy". During the entire scanning process, the scanner stylus 3 shall remain in constant contact with the workpiece 1. Scanner stylus 3, in a preferred embodiment, has a contact pin connected to an iron core such that when the pin is deflected during the scanning process the iron core is deflected as well. The core is initially positioned in a fixed coil system having a feeding coil and two measuring coils. The measuring coils form part of a balanced bridge circuit which upon deflection of the iron core produces an unbalanced AC output which is subsequently rectified to produce a DC output proportional to the scanner deflection in either or both coordinate directions.

In the scanning range "A" the measuring coordinate direction "x" is the primary coordinate and the measuring coordinate direction "y" the secondary coordinate. In the scanning range "B", "y" becomes the primary coordinate and "x" the secondary coordinate. Being in the state of the primary coordinate direction the inductive scanner and the workpiece 1 are always moving at a constant velocity in relation to each other.

At the onset of the scanning process, the workpiece 1 has been contacted in the direction of the measuring coordinate "y". The deflection of the scanner 3 in the direction of the measuring coordinate "y" is set at a reference value "S".

During the relative motion between the workpiece 1 and the inductive scanner 3 in the direction of the measuring coordinate "x" a deflection is observed at the inductive scanner 3 in the direction of the measuring coordinate "y" from the reference value "S" as the result of the configuration of the workpiece 1, which is converted into a corresponding electrical value. This value is transferred to a regulator to be described hereinbelow, which in turn actuates a motor to initiate a relative movement between the inductive scanner 3 and the workpiece in the direction of the measuring coordinate "y". The regulator is designed so that the reference value "S" is maintained approximately as set initially.

In the scanning range "A", as described hereinabove, the measuring coordinate direction "y" is the secondary coordinate, wherein the relative movement between the inductive scanner 3 and the workpiece 1 is affected by a regulating circuit. At Point C in FIG. 1, the velocity of the relative movement between the inductive scanner 3 and the workpiece 1 in the direction of the measuring coordinate "y" will be approximately as large as the relative movement between the two in the direction of the measuring coordinate "x".

Should the motion be continued in the direction of the measuring coordinate "x", the movement in the "y" direction would have to increase very strongly and at Point "D" the operation would become impossible. Therefore, a switch must be made in the scanning range "B", whereby, as described hereinabove, the measuring coordinate direction "y" becomes the primary and the measuring coordinate direction "x" the secondary coordinate.

This switching operation is effected when the velocities of the two relative motions are substantially equal. Precise equality is not required and as long as one rate is no further than 0.5 to 1.0% of the other rate, reversal will be accomplished. Multiple reversals (switching back and forth when rates are substantially equal) are prevented by the small hysteresis in the control/motor system.

In addition, the circuit regulating the motion in the secondary coordinate should be charged so that immediately following the switching operation it will set the correct initial velocity for the secondary constant relative motion between the scanner 3 and the workpiece 1.

An example of a circuit capable of satisfying these requirements is given in FIG. 2.

Therein, a control circuit 4, 5 and a regulating circuit 6, 7 is assigned to each measuring coordinate direction. The control circuits 4, 5 have a common computer 8, digital/analog converters 9 and 10, respectively, two resistances 11, 12 and 13, 14 each, amplifiers 15 and 16 each and power amplifiers 17 and 18, each.

The regulating circuits 6 and 7 include the amplifiers 15 and 16 in the control circuits 4 and 5, each of them being preceded by a series resistance 19 and 20.

In the feedback branch of each of the amplifiers 16 and 16, a RC circuit comprising condensers 21 and 22 and resistances 23 and 24, are inserted.

Switches 25 to 28 are assigned to each of the control circuits 4, 5 and the regulating circuits 6, 7; they are actuated by means of the relays 29–32. The switches 25–28 connect the control circuits 4, 5 or the regulating circuits 6, 7 with the motors 33 and 34, which move a coordinate table, not shown, in the measuring coordinate directions x and y. The extent of the movement of the coordinate table is controlled by a linear step transducer (LST) 35 and 36.

The mode of operation of the apparatus described is as follows: in the scanning range "A" according to FIG. 1 the measuring coordinate direction "x" is the primary coordinate. This signifies that the switch 25 is closed and the switch 26 is open (as shown). The digital values produced by the computer 8 are converted in the digital/analog converter 9 into an analog electrical voltage, which, after passing through the amplifier 15 and power amplifier 17, is translated by the motor 33 into a predetermined movement of the coordinate table in the direction of the measuring coordinates "x" at a constant velocity.

The switch 27 is closed by way of the relay 31 as the result of the contacting of the workpiece 1 by the inductive scanner 3 at the onset of the scanning process in the measuring coordinate direction "y", while the switch 28 is opened by means of the relay 32. In this manner, the voltage generated by the inductive scanner 3 and proportional to the deflection of said scanner from the reference value (as the scanner moves in the "x" direction), is passed to the amplifier 16, which is, with switch 28 open, a proportional integral controller. With the aid of the condenser 22 arranged in the feedback branch of the amplifier 16, the integral component of the regulating circuit 7 is acquired so that a voltage is provided at the output of the amplifier 16, said voltage being proportional to the velocity whereby the inductive scanner 3 must be moved in order to maintain the predetermined contact with the workpiece 1. This voltage arrives by way of the power amplifier 18 to the motor 34, which in turn moves the coordinate table, not shown, in the measuring coordinate direction "y", in this case in the secondary coordinate direction.

During the scanning process in range "A", the condenser 21 arranged in the feedback branch of the amplifier 15 is charged with the voltage proportional to the velocity of the motion in the primary coordinate direction, in the present case the measuring coordinate direction "x".

As described hereinabove, the scanning process should continue without stopping and without interruption of the acquisition of data. Therefore, said process must be switched at an appropriate time from the scanning range "A" in the measuring coordinate direction "x", into the scanning range "B" in the measuring coordinate direction "y".

The switching process is initiated by having computer 8 monitor at brief intervals, the velocities in both the primary and the secondary coordinate directions with the aid of a digital number comparison. This is effected such that the computer 8 in time intervals queries the positions of the coordinate table from the linear step transducers 35 and 36 connected with said table and calculates the path $\Delta l_x$ and $\Delta l_y$ between two callup times (t). Simultaneously, it also calculated the velocity of the motion by the formula $$V_x = \Delta l_x/t \text{ and } V_y = \Delta l_y/t.$$

When the computer 8 finds substantially equal velocities of the movements in the primary and secondary coordinate directions, it emits a signal causing an exchange of the predetermined values of the primary and secondary velocities.

At this point in time, the switches 25 and 27 are opened and the switches 26 and 28 closed (as shown in phantom lines). The regulating circuit 7 is thus removed from the effect of the inductive scanner 3 and the control circuit 5 activated. The motion in the measuring coordinate direction "y" is now controlled at the constant velocity specified by the computer 8 and that in the measuring coordinate direction "x" regulated by the contact of scanner 3. The condenser 21 belonging to the regulating circuit 6 as noted earlier has been charged with a voltage proportional to the moving velocity in the measuring coordinate direction "x" immediately prior to the changeover and therefore the transition is gradual and without arrest.

The circuit arrangement for the analog processing of regulating and control signals and the computer controlled surveillance of the velocity described hereinabove are merely exemplary of the invention and only one embodiment. Other arrangements for the embodiment of the process of the invention are possible. The linear step transducers 33 or 34 may be of the type available from Ernst Leitz Wetzlar GmbH, D-6330 Wetzlar, Federal Republic of Germany, under the designation "Laengenschrittgeber LSG-A 20/A 40." The coordinate table 1 may be of the type available in modular form from Ernst Leitz Wetzlar GmbH as an accessory to the "Leitz-MPV-System" microscope photometer or the "Leitz-T.A.S. Texture Analyzing System." Computer 8 may be a Wang 2200 VP, 32K; or Hewlett-Packard HP 9835 or MP 9845, 128K as employed in the "Leitz PMM 864" measuring machine.

Although the invention has been described relative to a specific embodiment thereof, it is not so limited and many modifications and variations thereof will be readily apparent to those skilled in the art in light of the above teachings. For example, different scanning elements such as piezoelectric bender elements, etc., could be used. It is not necessary that the coordinate table move but rather only that there be relative movement between the workpiece and the scanning head. Accordingly, the scanning head could be moved in at least two mutually orthogonal coordinate directions to measure the required workpiece. It is, therefore, to be understood that, within the scope of the appended claims, the invention may be practiced otherwise than as specifically described.

The embodiments of the invention in which an exclusive property or privilege is claimed are defined as follows:

1. A method of automatic measuring of a workpiece mounted on a coordinate table movable with respect to a scanning head in at least two mutually orthogonal coordinate directions by scanning said workpiece by at least obe stylus of said scanning head during movement in one coordinate direction and by maintaining constant a contact pressure of said stylus of said scanning head on said workpiece dependent upon electrical signals proportional to the deflection of said stylus according so the contour of said workpiece said method comprising the steps of:

moving said coordinate table by means of a predetermined control voltage along a first measuring coordinate direction (primary coordinate) after contacting said workpiece by said stylus of said scanning head by a predetermined force and along a second measuring coordinate direction (secondary coordinate); maintaining the contact pressure between said stylus and said workpiece by moving said coordinate table in said second measuring direction (secondary coordinate) in dependence of a control voltage corresponding to the defelction of said stylus from its base position;

measuring the velocity of movement in each of said coordinate directions;

comparing said velocities of movement;

reversing control of movement in said coordinate directions when said velocities are equal, so that said other coordinate direction movement is at least a relatively constant velocity (equal to the rate of movement in said one direction immediately prior to said switching step) and said one coordinate direction movement is controlled by said contact pressure of said scanning head with said workpiece;

continuing with the above measuring, comparing and switching sequences until the entire workpiece has been measured.

2. An apparatus for the automatic measuring of a workpiece mounted on a coordinate table, said apparatus including:

scanning means for producing an electrical signal indicative of contact pressure between a scanning head and said workpiece;

means for providing relative movement between said scanning head and said coordinate table in at least primary and secondary mutually orthogonal coordinate directions;

means for controlling said relative movement in said at least two coordinate directions, said means responsive to said scanning means, said control means enabling said movement means to provide a substantially constant rate of movement in said primary coordinate direction and a rate of movement in said secondary coordinate direction which maintains a predetermined constant pressure between said scanning head and said workpiece;

means for comparing rates of movement in said coordinate directions; and means, responsive to said comparing means, for reversing the designation of primary and secondary directions and control of said rates of movement when said rates of movement are compared and found to be substantially equal, said reversing means including means switching control of said substantially constant rate of movement in one direction to respond to a predetermined contact pressure between said scanning head and said workpiece, and switching control of movement in said other direction to a substantially constant rate of movement.

3. The method according to claim 1, wherein between said comparing and reversing steps, there is an additional step of sensing and storing a signal representative of the rate of movement in the primary coordinate direction which has a constant velocity and during said reversing step including the step of applying said signal indicative of said relatively constant velocity in said primary coordinate direction to initially establish a velocity of movement in said secondary coordinate direction which after said reversing step is subsequently controlled by said contact pressure of said scanning head.

4. An apparatus according to claim 2, further including means for storing an electrical signal indicative of said substantially constant rate of movement immediately prior to reversal and for applying said constant rate of movement electrical signal to said control means to maintain a constant rate of movement in said secondary coordinate direction until said switching control means switches said rate of movement in said secondary direction to respond to said predetermined contact pressure between said scanning head and said workpiece.

* * * * *